US007680407B2

(12) United States Patent
Hsiao et al.

(10) Patent No.: US 7,680,407 B2
(45) Date of Patent: Mar. 16, 2010

(54) AUTO-FOCUSING CAMERA

(75) Inventors: Cheng-Fang Hsiao, Taipei Hsien (TW); Bing Zhou, Shenzhen (CN); Ching-Hsing Huang, Taipei Hsien (TW); Chien-Long Hong, Taipei Hsien (TW); Jen-Hung Chung, Taipei Hsien (TW)

(73) Assignees: Fu Zhun Precision Industry (ShenZhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 554 days.

(21) Appl. No.: 11/561,319

(22) Filed: Nov. 17, 2006

(65) Prior Publication Data

US 2008/0118239 A1 May 22, 2008

(51) Int. Cl.
*G03B 13/34* (2006.01)
*G02B 7/02* (2006.01)
*H02K 41/00* (2006.01)

(52) U.S. Cl. .................. 396/133; 396/85; 310/12.21; 310/12.22; 310/14; 310/15; 359/824

(58) Field of Classification Search ............. 359/811, 359/817, 822–824; 396/192, 532, 85, 133; 348/340; 310/12.21, 12.22, 14, 15
See application file for complete search history.

(56) References Cited

U.S. PATENT DOCUMENTS

| 4,154,510 | A | * | 5/1979 | Katagiri | 359/826 |
|4,905,031 | A | * | 2/1990 | Mody | 396/133 |
| 7,039,309 | B2 | | 5/2006 | Hsiao | |
| 2004/0165877 | A1 | * | 8/2004 | Hsiao | 396/85 |
| 2004/0174614 | A1 | * | 9/2004 | Hovanky | 359/694 |
| 2006/0061223 | A1 | * | 3/2006 | Manabe | 310/80 |
| 2006/0153556 | A1 | * | 7/2006 | Lee et al. | 396/133 |

FOREIGN PATENT DOCUMENTS

TW          556851 Y          10/2003

OTHER PUBLICATIONS

Academic Press Dictionary of Science and Technology, "Seat" definition.*

* cited by examiner

*Primary Examiner*—W. B. Perkey
*Assistant Examiner*—Leon W Rhodes
(74) *Attorney, Agent, or Firm*—Frank R. Niranjan

(57) ABSTRACT

An auto focusing camera includes a lens unit (2) including a barrel (20) and a lens (22) received in the barrel, a permanent magnet (3) being fixedly mounted around the barrel of the lens unit and moving with the lens unit when the lens unit undergoes telescopic movement during operation, and a coil seat (6a, 6b) with a coil (5a, 5b) wound thereon arranged at a side of the permanent magnet. An interlocking device (642, 202) is formed on the barrel and the coil seat for guiding the telescopic movement of the lens unit.

11 Claims, 5 Drawing Sheets

AUTO-FOCUSING CAMERA

BACKGROUND OF THE INVENTION

1. Field of the Invention

The present invention relates generally to a lens drive mechanism of a camera, and more particularly to a lens drive mechanism of a two-step auto-focusing lens.

2. Description of Related Art

Over the years cameras have evolved toward lightweight compactness; however, conventionally an auto focus structure is used for controlling the telescopic movement of a lens of the camera and this occupies space in the camera.

The auto-focus structure of the camera focuses on an object by comparing the desired focus with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by a motor structure. Generally the motor structure is column-shaped, including coils wound therearound and a permanent magnet being mounted around the lens. During operation of the motor, a current is applied to the coils to establish an alternating magnetic field. The magnetic field of the permanent magnet interacts with the alternating magnetic field of the coils to drive the lens to move. At the moment when the CPU detects a focused image as the lens moves back and forth, a stop signal is simultaneously sent to the motor. Therefore, the lens stops at the best focal position (static position).

However, a narrow gap is usually defined between an outer surface of the lens and an inner surface of the motor, the lens may easily swing and rotate during telescopic movement, which, in most of cases, results in unstable and imprecise movement of the lens of the camera. Such a shortcoming needs to be solved.

SUMMARY OF THE INVENTION

According to a preferred embodiment of the present invention, an auto focusing camera includes a lens unit, a permanent magnet being fixedly mounted around the lens unit to move with the lens unit when the lens unit is in telescopic movement, and at least one coil seat with a coil wound thereon arranged at a side of the permanent magnet. The lens unit includes a barrel and a lens received in the barrel. An interlocking device is formed on the barrel and the coil seat for guiding the telescopic movement of the lens unit to obtain stable and precise movement of the lens unit of the camera.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
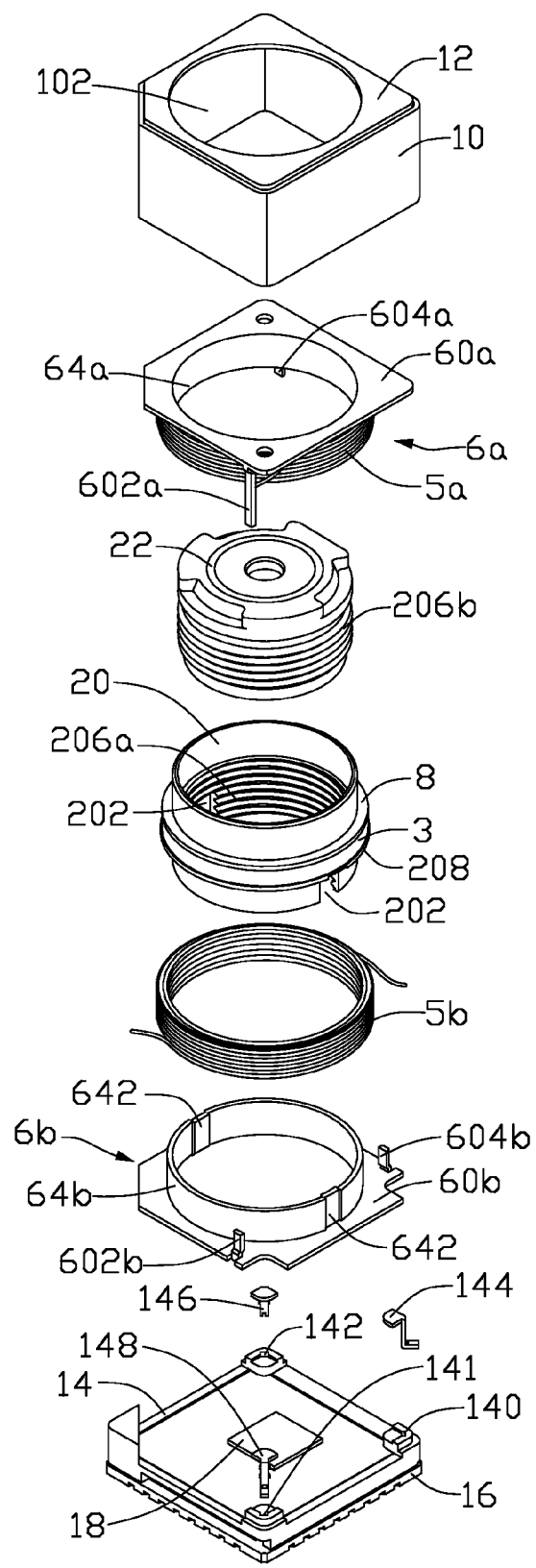
FIG. 1 is an isometric, exploded view of an auto-focusing camera in accordance with a preferred embodiment of the present invention.
Figure 2:
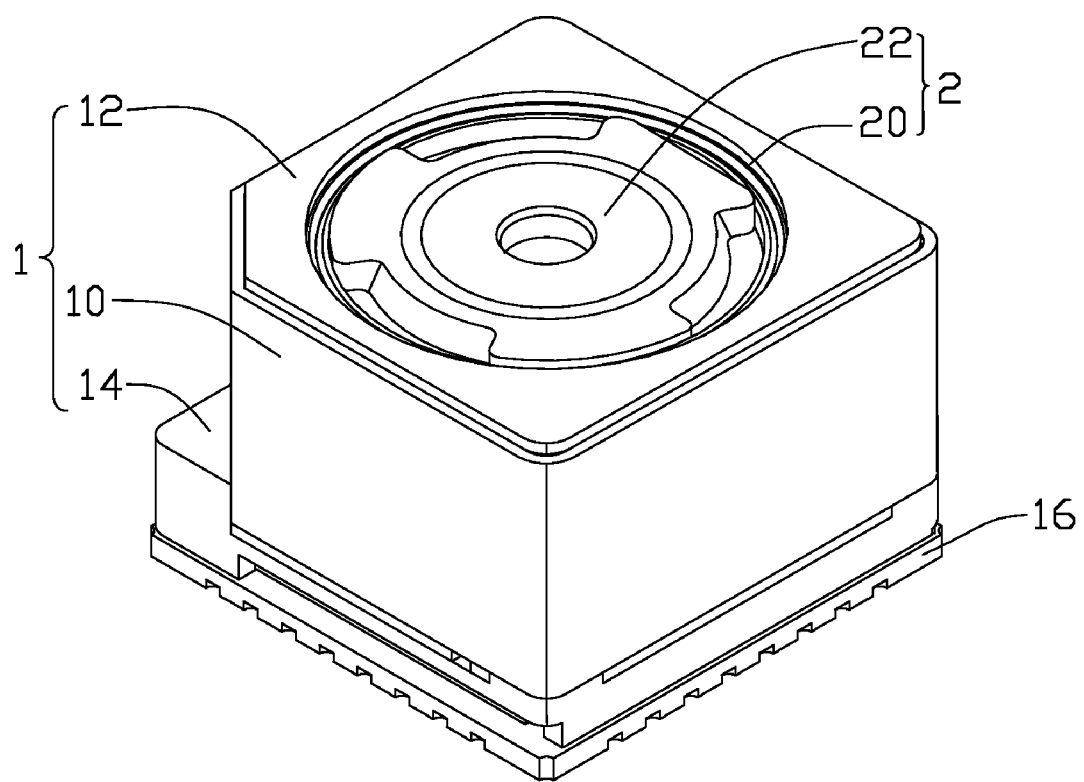
FIG. 2 is an assembled view of FIG. 1.
Figure 3:
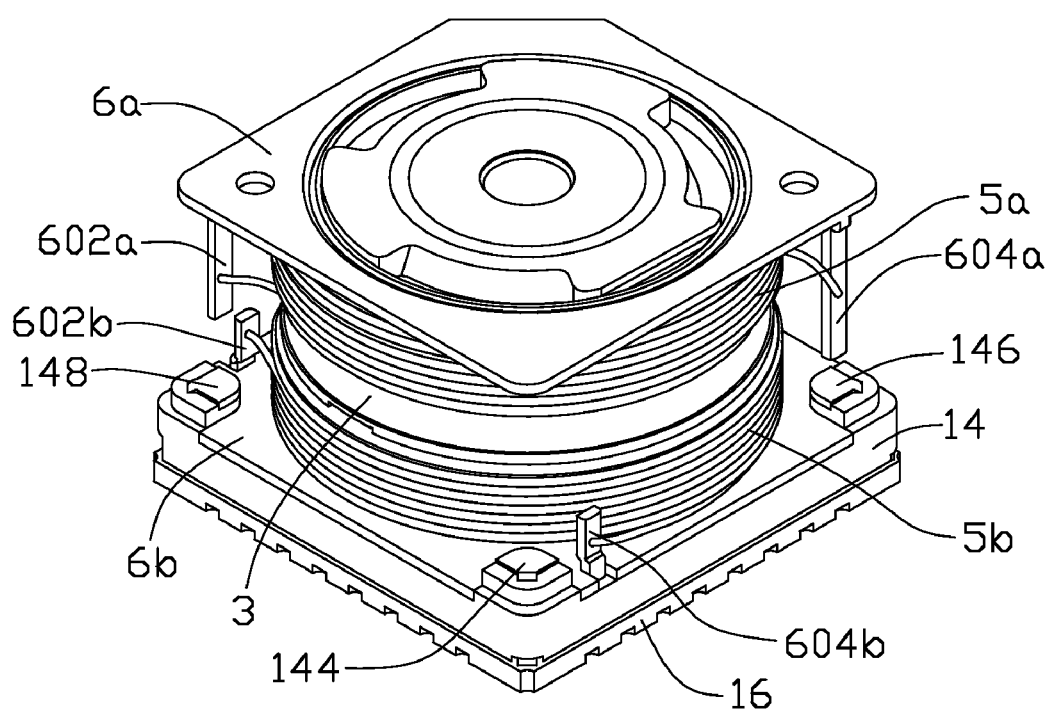
FIG. 3 is similar to FIG. 2, but showing the auto-focusing camera without a sidewall.
Figure 4:
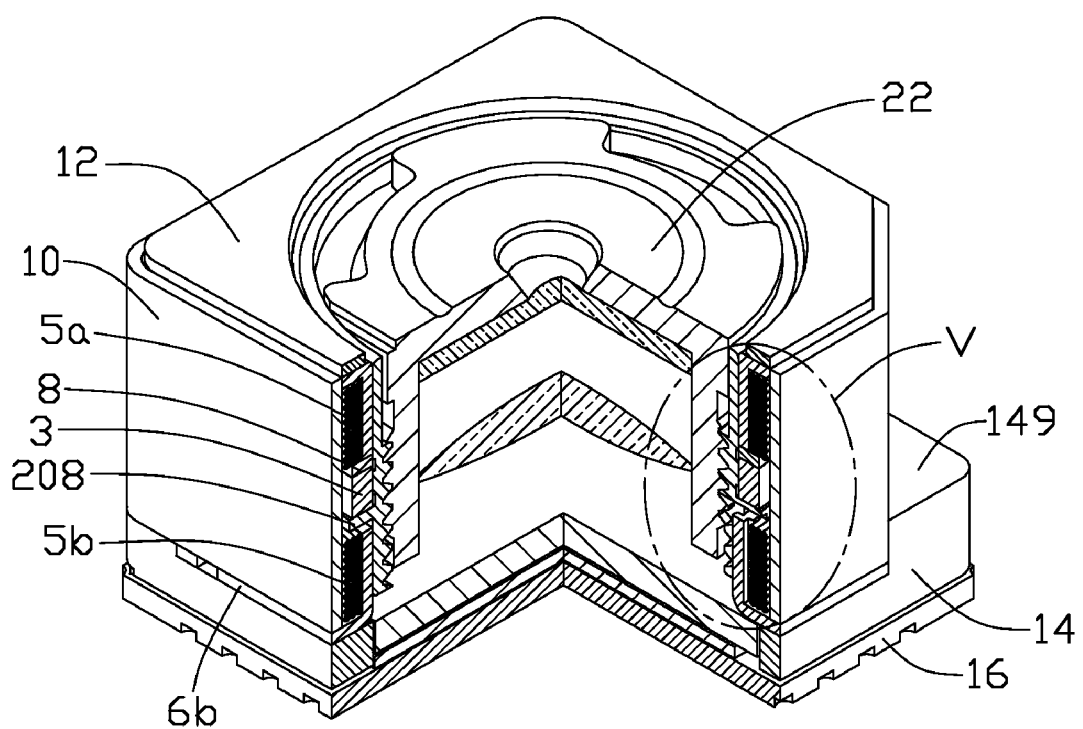
FIG. 4 shows a half section view of the auto-focusing camera of FIG. 2.

Referring to FIGS. 1-4, an auto-focusing camera in accordance with a preferred embodiment of the present invention includes a lens mount 1, a lens unit 2 received in the lens mount 1, and a motor (not labeled) for driving the lens unit 2 into telescopic movement.

The lens mount 1 includes a base 14, a sidewall 10 mounted on the base 14, and a cover 12 mounted on the sidewall 10. The base 14, the sidewall 10 and the cover 12 cooperatively define a space (not labeled) for receiving the lens unit 2 and the motor. An aperture 102 is defined in a central portion of the cover 12 for telescopic extension of the lens unit 2 therethrough. A circuit board 16 with an image sensor 18 mounted thereon is arranged under the base 14 of the lens mount 1. The base 14 is square-shaped and forms a protrusion (not labeled) on each corner thereof. First and second connecting pins 146, 144 extend through first and second holes 142, 140 defined in two neighboring protrusions of the base 14 for electrically connecting the motor to a power source (not shown). The connecting pins 146, 144 are "Z"-shaped and extend through the base 14. A third connecting pin 148 is received in a blind hole 141 which is defined in another protrusion of the base 14. The sidewall 10 is approximately a hollow cuboid-shape. When the sidewall 10 is mounted on the base 14, the corners of the sidewall 10 engage with the protrusions to be fixedly mounted on the base 14.

The lens unit 2 is approximately column-shaped and has an outer diameter approximately the same as a diameter of the aperture 102 of the cover 12. The lens unit 2 includes a barrel 20 and a lens 22 fixedly mounted in the barrel 20. The barrel 20 forms an inner thread 206a on an inner surface thereof, and the lens 22 forms an outer thread 206b on an outer surface thereof for being threadedly engaged with the inner thread 206a of the barrel 20. A pair of grooves 202 are defined in a bottom end of the barrel 20. The grooves 202 extend through the barrel 20 along a radial direction thereof.

The motor includes a permanent magnet 3 mounted around the barrel 20 and attached to a middle of the outer surface of the barrel 20, and upper and lower coil seats 6a, 6b with upper and lower coils 5a, 5b wound thereon being arranged at upper and lower sides of the magnet 3, respectively. The coil seats 6a, 6b are made of material such as silicone steel, which can be easily magnetized when a magnetic field is applied thereto. Each of the coil seats 6a, 6b includes a basewall 60a, 60b and a ring-shaped flange 64a, 64b extending perpendicularly from an inner circumference of the basewall 60a, 60b. A pair of blocks 642 are formed on an inner surface of the flange 64b of the lower coil seat 6b corresponding to the grooves 202 of the barrel 20 of the lens unit 2. The blocks 642 are integrally formed with the flange 64b of the lower coil seat 6b. The basewalls 60a, 60b of the upper and lower coil seats 6a, 6b each form two mounting pins 602a, 604a, 602b, 604b extending perpendicularly from the basewalls 60a, 60b, wherein the mounting pins 602a, 604a extend downwardly and the mounting pins 602b, 604b extend upwardly. The mounting pins 602a, 604a of the upper basewall 60a are formed on two diagonal corners thereof, and the mounting pins 602b, 604b of the lower basewall 60b are formed on two neighboring corners thereof. Upper and lower magnetically shielding layers 8, 208 are adhered to the upper and lower sides of the magnet 3, respectively. The shielding layers 8, 208 are made of electrically conductive material, such as copper.

When assembled, the magnet 3 is fixedly adhered to the middle of the outer surface of the barrel 20 of the lens unit 2. The lens unit 2 with the magnet 3 is then movably received in the space of the lens mount 1. The upper and lower coil seats 6a, 6b with upper and lower coils 5a, 5b wound thereon are received in the space and are arranged on the upper and lower sides of the magnet 3, respectively. The blocks 642 of the lower coil seat 6b engage into the grooves 202 of the lens unit 2 to limit rotation of the lens unit 2. The ends of the upper coil 5a are wound on the mounting pins 602a, 604a of the upper coil seat 6a, respectively, and then are electrically connected to the first and third connecting pins 146, 148, respectively. The ends of the lower coil 5b are wound on the mounting pins 602b, 604b of the lower coil seat 6b, respectively, and then are electrically connected to the second and third connecting pins 144, 148, respectively. During operation, the first and second connecting pins 146, 144 are connected to positive pole and negative pole of the power source, respectively. Thus a current is applied to the two coils 5a, 5b by flowing first through the first coil 5a and then the second coil 5b. Induced magnetic fields established by the upper and lower coils 5a, 5b have polarities opposite to each other.

Figure 5:
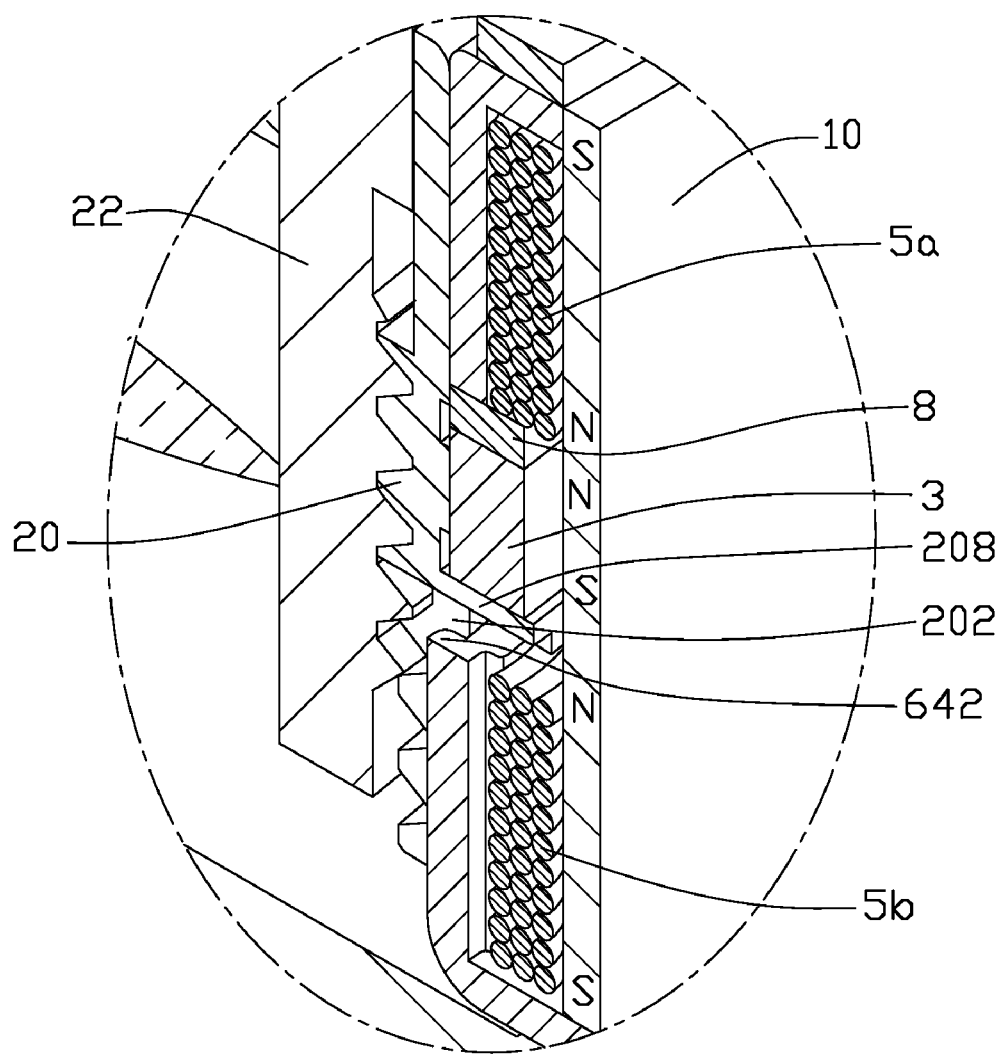
FIG. 5 shows an enlarged view of a circled portion V of FIG. 4.

As shown in FIG. 5, assuming the upper side of the magnet 3 is N (north pole), and the lower side of the magnet 3 is S (south pole). The lens unit 2 is at its front focal point (a bottom end of the upper coil seat 6a) initially. The upper flange 64a abuts the upper insulating layer 8, whilst the lower flange 64b is separated by a space from the lower insulating layer 208. The induced magnetic field of the upper coil 5a has polarity opposite to that of the magnet 3. A top end of the upper coil seat 6a near the cover 12 is S, whilst the bottom end of the upper coil seat 6a near the upper side of the magnet 3 is N. The induced magnetic field of the lower coil 5b has the same polarity as that of the magnet 3. A bottom end of the lower coil seat 6b positioned near the base 14 is S, whilst a top end of the lower coil seat 6b positioned near the lower side of the magnet 3 is N. Thus an attractive force is generated between the lower coil seat 6b and the magnet 3, whilst a repelling force is generated between the upper coil seat 6a and the magnet 3. The lens unit 2 with the magnet 3 fixedly mounted thereon moves downwardly to its rear focal point (the top end of the lower coil seat 6b) from the bottom end of the upper coil seat 6a to the top end of the lower coil seat 6b. When the lens unit 2 reaches the rear focal point, the current supplied to the upper and lower coils is switched off. The coil seats 6a, 6b have residual magnetic forces which interact with the magnetic force of the permanent magnet 3 thereby holding the lens unit 2 at the rear focal point.

On the other hand, when the lens unit 2 is at the rear focal point and moves to the front focal point, the currents are applied to the coils 5a, 5b with a direction different from that for moving the lens unit 2 from the front focal point to the rear focal point. At this situation, the polarities of the upper and lower coil seats 6a, 6b are switched accordingly. Attractive force is generated between the upper coil seat 6a and the magnet 3, and repelling force is generated between the lower coil seat 6b and the magnet 3. The lens unit 2 with the magnet 3 moves upwardly to its front focal point from the top end of the lower coil seat 6b to the bottom end of the upper coil seat 6a under the attractive force of the upper coil seat 6a and the repelling force of the lower coil seat 6b. For the grooves 202 and blocks 642 formed on the lower coil seat 6b and the barrel 20, the barrel 20 and lower coil seat 6b interlock with each. Thus the barrel 20 avoids rotation and swinging when the lens 22 undergoes telescopic movement and stable and precise movement of the lens 22 can be obtained. In this embodiment, the blocks 642 are formed on the lower coil seat 6b, whilst the grooves 202 are defined in the barrel 20. Alternatively, the grooves 202 can be defined in the lower coil seat 6b, whilst the blocks 642 can be formed on the barrel 20. Understandably, the blocks 642 and the grooves 202 are used as interlocking device to guide movement of the barrel 20, and thus the number and shapes of the interlocking device are not limited. For example, the blocks 642 can be column shaped, cuboid shaped or semi-column shaped. The grooves 202 are configured to receive the blocks 642 therein. Also the interlocking device can be formed on the upper coil seat 6a and top end of the barrel 20 to avoid rotation and swinging of the lens 22. Alternatively, the interlocking device can be formed on the upper and lower coil seats 6a, 6b and the top and bottom ends of the barrel 20 of the lens unit 2.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auto-focus camera comprising:
    a lens unit including a barrel and a lens received in the barrel;
    a permanent magnet being fixedly mounted around the barrel of the lens unit, and moving with the lens unit when the lens unit is in telescopic movement during operation;
    a coil seat with a coil wound thereon arranged at a side of the permanent magnet;
    another coil seat with another coil wound thereon arranged at an opposite side of the permanent magnet; and
    an interlocking device formed between the barrel and the coil seat for guiding telescopic movement of the lens unit;
    wherein the interlocking device comprises at least one groove defined in one of the barrel and the coil seat, and at least one block formed on the other one of the barrel and the coil seat engaging into the at least one groove; and
    wherein each of the coil seats comprises a basewall, a ring-shaped flange extending perpendicularly from an inner circumference of the basewall and a plurality of mounting pins extending perpendicularly from the basewall, the coils respectively wound on the flanges, ends of the coils wound on the mounting pins.

2. The auto-focus camera of claim 1, wherein the at least one groove is defined in the coil seat, and the at least one block is formed on the barrel of the lens unit.

3. The auto-focus camera of claim 1, wherein the at least one groove is defined in the barrel of the lens unit, and the at least one block is formed on the coil seat.

4. The auto-focus camera of claim 1, wherein the block is integrally formed with the one of the barrel and the coil seat, and the groove extends through the other one of the barrel and the coil seat along a radial direction thereof.

5. The auto-focus camera of claim 1, wherein the block and the groove have one of the following shapes: column shaped, cuboid shaped and semi-column shaped.

6. The auto-focus camera of claim 1, wherein the interlocking device is located corresponding to a top end of the lens unit.

7. The auto-focus camera of claim 1, wherein the interlocking device is located corresponding to a bottom end of the lens unit.

8. The auto-focus camera of claim 1, further comprising a lens mount receiving the motor, the lens unit and the coil seat therein, the lens mount comprising a base forming a plurality of connecting pins for electrically connecting the coil to a power source to drive the movement of the lens.

9. The auto-focus camera of claim 8, wherein the connecting pins are z-shaped and extend through the base.

10. The auto-focus camera of claim 8, further comprising a circuit board arranged under the base with an image sensor mounted thereon, the connecting pins being electrically connected with the circuit board.

11. The auto-focus camera of claim 1, wherein the coil seats respectively locate at upper and lower sides of the permanent magnet, and upper and lower magnetically shielding layers are adhered to the upper and lower sides of the permanent magnet, respectively, when the lens unit is at a first focal point, the flange of the coil seat located at the upper side of the permanent magnet abuts the upper magnetically shielding layer, whilst the flange of the coil seat located at the lower side of the permanent magnet is separated a distance from the lower magnetically shielding layer, when the lens unit is at a second focal point, the flange of the coil seat located at the upper side of the permanent magnet is separated a distance from the upper magnetically shielding layer, whilst the flange of the coil seat located at the lower side of the permanent magnet abuts the lower magnetically shielding layer.

* * * * *